US012439076B2

(12) United States Patent
Yu et al.

(10) Patent No.: US 12,439,076 B2
(45) Date of Patent: Oct. 7, 2025

(54) SELECTIVE SUBBLOCK-BASED MOTION REFINEMENT

(71) Applicant: Telefonaktiebolaget LM Ericsson (publ), Stockholm (SE)

(72) Inventors: Ruoyang Yu, Täby (SE); Kenneth Andersson, Gävle (SE); Jacob Ström, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 100 days.

(21) Appl. No.: 18/575,262

(22) PCT Filed: Jun. 2, 2022

(86) PCT No.: PCT/SE2022/050531
§ 371 (c)(1),
(2) Date: Dec. 28, 2023

(87) PCT Pub. No.: WO2023/277755
PCT Pub. Date: Jan. 5, 2023

(65) Prior Publication Data
US 2024/0333968 A1    Oct. 3, 2024

Related U.S. Application Data

(60) Provisional application No. 63/216,729, filed on Jun. 30, 2021.

(51) Int. Cl.
*H04N 19/132*    (2014.01)
*H04N 19/139*    (2014.01)
(Continued)

(52) U.S. Cl.
CPC ......... *H04N 19/521* (2014.11); *H04N 19/132* (2014.11); *H04N 19/139* (2014.11); *H04N 19/176* (2014.11)

(58) Field of Classification Search
CPC .. H04N 19/521; H04N 19/132; H04N 19/139; H04N 19/176
(Continued)

(56) References Cited

U.S. PATENT DOCUMENTS

| 2020/0007888 A1 | 1/2020 | Xu et al. |
| 2020/0107015 A1 | 4/2020 | Seo et al. |
| 2020/0351494 A1 | 11/2020 | Yu et al. |

FOREIGN PATENT DOCUMENTS

| WO | 2019111835 A1 | 6/2019 |
| WO | 2020169083 A1 | 8/2020 |

(Continued)

OTHER PUBLICATIONS

International Search Report and Written Opinion with Transmittal dated Jun. 17, 2022 in International Application No. PCT/SE2022/050531 (14 pages).
(Continued)

*Primary Examiner* — Nguyen T Truong
(74) *Attorney, Agent, or Firm* — Rothwell, Figg, Ernst & Manbeck, P.C.

(57) ABSTRACT

There is provided a method of encoding a picture. The method comprises selecting a motion vector, MV, for a current block within the picture. The method comprises determining whether a condition is satisfied, wherein determining whether the condition is satisfied comprises: (i) determining if a subblock-based motion refinement is applicable for the current block and (ii) determining if a first subblock within the current block satisfies a criteria. The method comprises, as a result of determining that the condition is satisfied, not using the selected MV for encoding the current block.

20 Claims, 7 Drawing Sheets

(51) Int. Cl.
*H04N 19/176* (2014.01)
*H04N 19/513* (2014.01)

(58) Field of Classification Search
USPC .................................................. 375/240.16
See application file for complete search history.

(56) References Cited

FOREIGN PATENT DOCUMENTS

| WO | 2020177696 A1 | 9/2020 |
|----|---------------|--------|
| WO | 2020177727 A1 | 9/2020 |
| WO | 2020182216 A1 | 9/2020 |
| WO | 2020211755 A1 | 10/2020 |

OTHER PUBLICATIONS

Yu, R. et al., "AHG10: Encoder MV selections and DMVR", Document: JVET-W0061-v3, Joint Video Experts Team (JVET) of ITU-T SG 16 WP 3 and ISO/IEC JTC 1/SC 29, 23rd Meeting, by teleconference, Jul. 7-16, 2021 (6 pages).

Huang, H. et al., "EE2-related: Adaptive decoder side motion vector refinement", Document: JVET-W0107-v2, Joint Video Experts Team (JVET) of ITU-T SG 16 WP 3 and ISO/IEC JTC 1/SC 29, 23rd Meeting, by teleconference, Jul. 7-16, 2021 (3 pages).

Chen, C. et al., "Non-CE9: Evaluation of Threshold Value Applied to SAD-based Early Termination in DMVR", Joint Video Experts Team (JVET) of ITU-T SG WP 3 and ISO/IEC JTC 1/SC 29 WG 11, Document: JVET-N0644-v1, 15th Meeting: Gothenburg, SE, Jul. 3-17, 2019 (3 pages).

Chen, J. et al., "Algorithm description for Versatile Video Coding and Test Model 12 (VTM 12)" Joint Video Experts Team (JVET) of ITU-T SG 16 WP 3 and ISO/IEC JTC 1/SC 29, Document: JVET-U2002-v1, 21st Meeting, by teleconference, Jun. 6-15, 2021 (101 pages).

Sjöberg, R. et al., "Description of SDR and HDR video coding technology proposal by Ericsson and Nokia", Joint Video Experts Team (JVET) of ITU-T SG 16 WP3 and ISO/IEC JTC 1/SC 29/WG 11, Document: JVET-J0012-v1, 10th Meeting: San Diego, CA, USA, Apr. 10-20, 2018 (32 pages).

SELECTIVE SUBBLOCK-BASED MOTION REFINEMENT

CROSS REFERENCE TO RELATED APPLICATIONS

This application is a 35 U.S.C. § 371 National Stage of International Patent Application No. PCT/SE2022/050531, filed 2022 Jun. 2, which claims a priority to U.S. Patent Application No. 63/216,729, filed 2021 Jun. 30.

TECHNICAL FIELD

This disclosure relates to methods and apparatus for selective triggering of subblock-based motion refinement.

BACKGROUND

Video and Picture

A video (a.k.a., video sequence) consists of a series of pictures (a.k.a., images) wherein each picture consists of one or more components. In Versatile Video Coding (VVC), each picture is identified with a picture order count (POC) value.

HEVC and VVC

High Efficiency Video Coding (HEVC) is a block-based video codec standardized by ITU-T and MPEG that utilizes both temporal and spatial prediction. Spatial prediction is achieved using intra (I) prediction from within the current picture. Temporal prediction is achieved using uni-directional (P) or bi-directional inter (B) prediction on block level from previously decoded reference pictures. In the encoder, the difference between the original pixel data and the predicted pixel data, referred to as the residual, is transformed into the frequency domain, quantized and then entropy coded before transmitted together with necessary prediction parameters such as prediction mode and motion vectors, also entropy coded. The decoder performs entropy decoding, inverse quantization and inverse transformation to obtain the residual, and then adds the residual to an intra or inter prediction to reconstruct a picture.

MPEG and ITU-T are working on the successor to HEVC within the Joint Video Exploratory Team (JVET). The name of this video codec is Versatile Video Coding (VVC) and version 1 of VVC specification, which is the current version of VVC at the time of writing, has been published as Rec. ITU-T H.266|ISO/IEC 23090-3, "Versatile Video Coding", 2020.

Components

Each component can be described as a two-dimensional rectangular array of sample values. It is common that a picture in a video sequence consists of three components; one luma component Y where the sample values are luma values and two chroma components Cb and Cr, where the sample values are chroma values. It is also common that the dimensions of the chroma components are smaller than the luma components by a factor of two in each dimension. For example, the size of the luma component of an HD picture would be 1920×1080 and the chroma components would each have the dimension of 960×540. Components are sometimes referred to as color components.

Coding Unit and Coding Block

A block is one two-dimensional array of samples. In video coding, each component is split into blocks and the coded video bitstream consists of a series of coded blocks. It is common in video coding that the picture is split into units that cover a specific area of the picture. Each unit consists of all blocks from all components that make up that specific area and each block belongs fully to one unit. The macroblock in H.264 and the Coding unit (CU) in HEVC are examples of units. In VVC, the CUs may be split recursively to smaller CUs. The CU at the top level is referred to as coding tree unit (CTU).

A CU usually contains three coding blocks—i.e., one coding block for luma and two coding blocks for chroma. The size of the luma coding block is the same as the CU. In the current VVC (i.e., version 1), the CUs can have the size of 4×4 up to 128×128.

Intra Prediction

In intra prediction (also known as spatial prediction), a block is predicted using previously decoded blocks within the same picture. In other words, samples inside the previously decoded blocks within the same picture are used to predict the samples inside the current block. A picture consisting of only intra-predicted blocks is referred to as an intra picture.

Inter Prediction

In inter prediction (also known as temporal prediction), blocks of the current picture are predicted using blocks of previously decoded pictures. In other words, the samples from the blocks of the previously decoded pictures are used to predict the samples of the current block. A picture that allows inter-predicted block is referred to as an inter picture. The previously decoded pictures used for inter prediction are referred to as reference pictures.

Figure 1A:
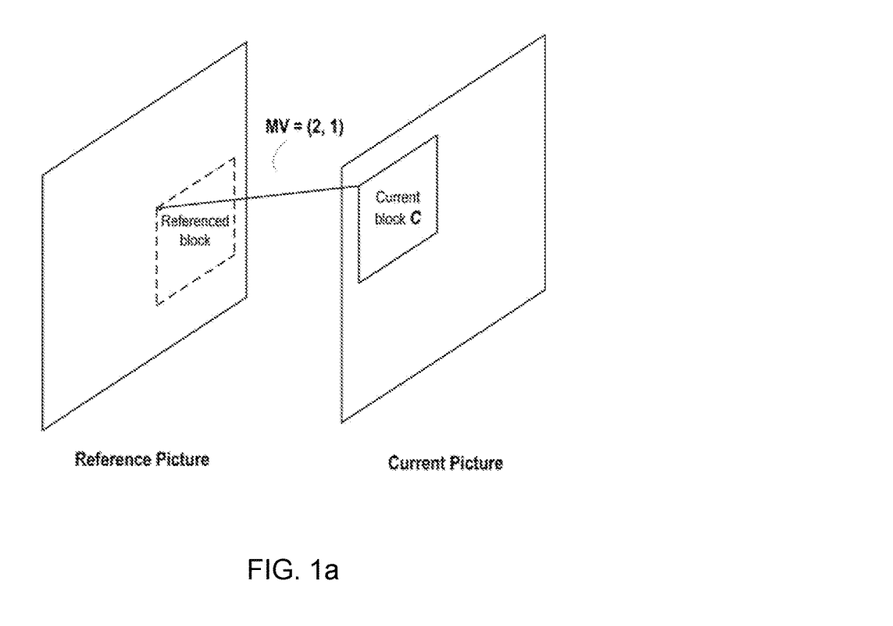
FIG. 1a shows an example of a motion vector (MV).

The location of the referenced block inside the reference picture is indicated using a motion vector (MV). Each MV consists of x and y components each of which represents a displacement between current block and the referenced block in x or y dimension. The value of a component may have a resolution finer than an integer position. When that is the case, a filtering (typically interpolation) is done to calculate values used for prediction. FIG. 1a shows an example of a MV for current block C. The MV=(2,1) indicates that the position of reference block is two steps to the right and one step down from the position of the current block.

An inter picture may use several reference pictures. The reference pictures are usually put into two reference picture lists, L0 and L1. The reference pictures that are output before the current picture are typically the first pictures in L0. The reference pictures that are output after the current picture are typically the first pictures in L1.

Figure 2:
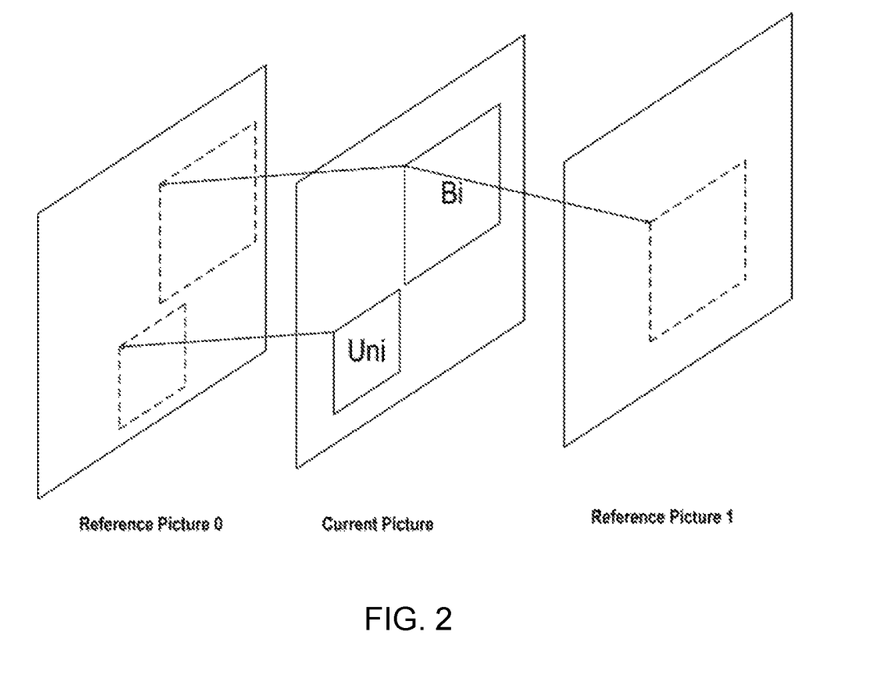
FIG. 2 illustrates uni-inter prediction and bi-inter prediction.

One of two prediction types—uni-prediction and bi-prediction—may be used for inter predicted block. Uni-predicted block may be predicted from one reference picture, either using L0 or L1. Bi-predicted block may be predicted from two reference pictures, one from L0 and the other from L1. FIG. 2 shows an example of the prediction types.

Fractional MVs

Figure 1B:
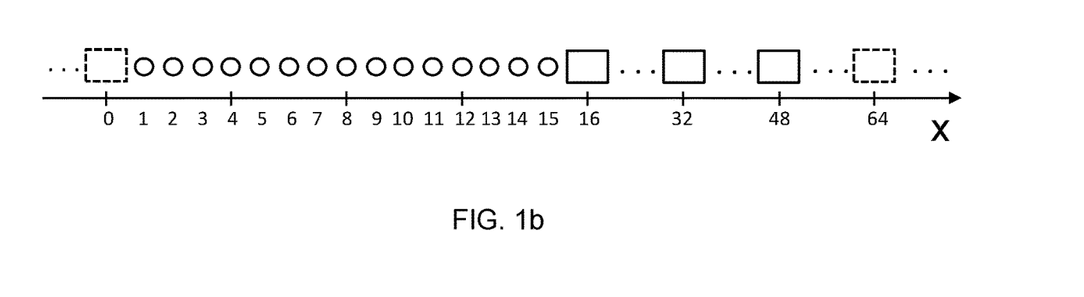
FIG. 1b illustrates examples of MV sample positions in the horizontal (x-) dimension.

The value of an MV's x or y component may corresponds to a sample position which has finer granularity than an integer (sample) position. Those positions are also referred to as fractional (sample) positions. In VVC, an MV can be at a 1/16 sample position. FIG. 1b shows several fractional positions in the horizontal (x) dimension. The solid-square blocks represent integer (sample) positions while the circles represent fractional (sample) positions-1/16-position. For example, MV=(4, 10) means that the x component of the MV is at 4/16 sample position and the y component of the MV is at 10/16 sample position.

Residual, Transform, and Quantization

The difference between samples of a source block (which contains original samples) and samples of a prediction block is often called "residual block." The residual block is then typically compressed by a spatial transform to remove further redundancy. The transform coefficients of the spatial transform are then quantized by a quantization parameter (QP) to control the fidelity of the residual block and also the bitrate required to compress the block. A coded block flag (CBF) is used to indicate if there are any non-zero quantized transform coefficients. All coding parameters are then entropy coded at the encoder and decoded at the decoder. A reconstructed block can then be derived by inverse quantization and inverse transformation of the quantized transform coefficients if the coded block flag is one and the reconstructed block may be added to the prediction block.

Hierarchical Picture Coding Structure

Figure 3:
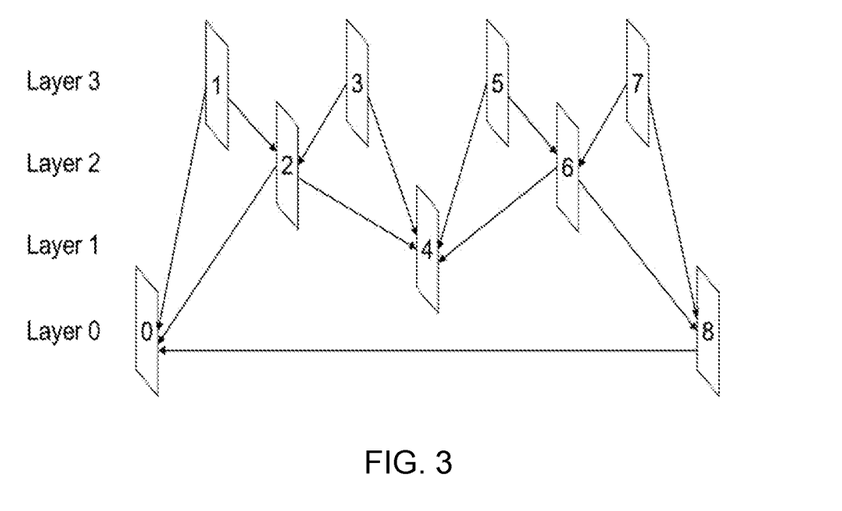
FIG. 3 shows an example of a four-layer B-GOP structure.

In what is often referred to as "random access configuration," intra coded pictures are positioned with a fixed interval (e.g., every second). Pictures between the intra coded pictures are typically coded with a B-GOP structure as shown in FIG. 3. FIG. 3 shows an example of a four-layer B-GOP structure using two reference pictures per a picture. Picture 0 is coded first and then picture 8 is coded using picture 0 as its reference picture. Then picture 8 and picture 0 are used as reference pictures to code picture 4. Then similarly, picture 2 and picture 6 are coded using pictures 0, 4, and 8. Then, pictures 1, 3, 5 and 7 are coded using pictures 1, 2, 4, 6, and 8.

Pictures 1, 3, 5, and 7 are referred to be on the highest hierarchical level, pictures 2 and 6 are referred to be on the second highest hierarchical level, picture 4 is referred to be on third highest level, and picture 8 is referred to be on the lowest level. Typically pictures 1, 3, 5, and 7 are not used for reference of any other pictures. They are called non-reference pictures.

The assigned QPs for the pictures are usually different and are set according to the hierarchy level. Higher QP is assigned for picture(s) that at higher hierarchy level.

Inter Prediction/Motion Information

Inter prediction information of an inter coded block in an inter coded picture in VVC may consist of the following three elements:

1. A reference picture list flag (RefPicListFlag). The flag signals which reference picture list is used. When the value of the flag is equal to 0, it means L0 is used. When the value of the flag is equal to 1, it means L1 is used. When the value of the flag is equal to 2, it means both L0 and L1 are used.

2. A reference picture index (RefPicIdx) per reference picture list used. The index signals which reference picture inside the reference picture list is used.

3. A motion vector (MV) per reference picture used. The MV signals the position inside the reference picture that is used for predicting the current block.

The inter prediction information is also referred to as motion information. The decoder stores the motion information for each inter coded block. In other words, an inter coded block maintains its own motion information.

Encoder Decision and Rate Distortion (RD) Cost

In order for an encoder to decide the best prediction mode for a current block, the encoder will evaluate many or all of the possible prediction modes for the current block and select the prediction mode that yields the smallest Rate-Distortion (RD) cost.

The RD cost may be calculated as $D+\lambda*R$. The D (Distortion) measures the difference between the reconstructed block and the corresponding source block. One commonly used metric for calculating D is the sum of squared difference $SSE=\Sigma_{x,y}(P_A(x,y)-P_B(x,y))^2$, where $P_A$ and $P_B$ are the sample values in two blocks A and B respectively. The R (Rate) is usually an estimation of the number of bits to be spent for encoding in the mode. The $\lambda$ is a trade-off parameter between R and D.

Motion Information Signalling

VVC includes several methods of implicitly signaling motion information for each block, including the merge method and the subblock merge method. A common motivation behind the implicit methods is to inherit motion information from neighboring coded blocks.

Merge (a.k.a., Block Merge) Method

The merge method is similar to the one in the HEVC standard. The method is sometimes referred to as block merge method since the derived motion information is used for generating the samples of the entire block.

Figure 4:
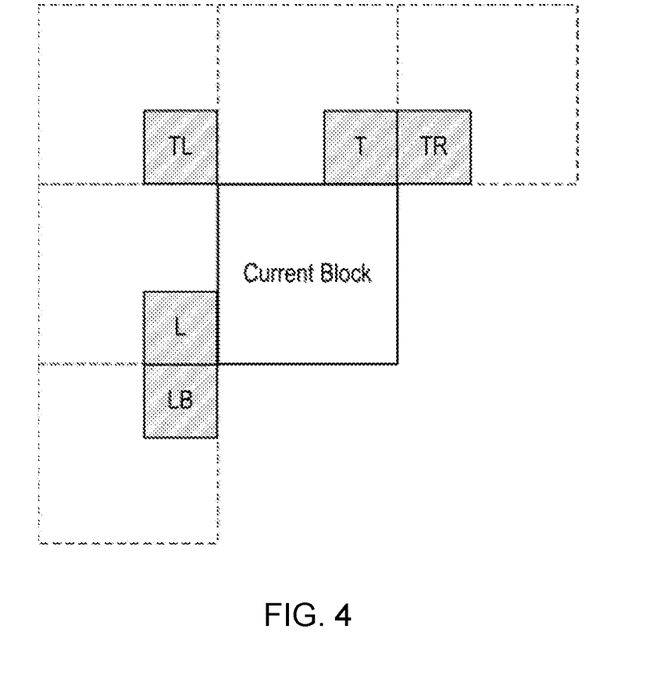
FIG. 4 shows possible spatial blocks for fetching neighboring motion information.

The method first generates a list of motion information candidates. The list is also referred to as merge list. The candidates are derived from previously coded blocks. The blocks can be spatially adjacent neighboring blocks (neighboring the current block) or temporal collocated blocks relative to the current block. FIG. 4 shows possible spatial blocks for fetching neighboring motion information—the spatial neighboring blocks: left (L), top (T), top-right (TR), left-bottom (LB), and top-left (TL).

After the merge list is generated, one of the candidates inside the list is used to derive the motion information of the current block. The candidate selection process is done on the encoder side. An encoder may select a best candidate from the list and encode an index (merge_index) in the bitstream to signal to a decoder. The decoder receives the index, follows the same merge list derivation process as the encoder, uses the index to retrieve the correct candidate.

Explicit Motion Information Signalling

VVC also includes explicit motion information signalling methods such as alternative motion vector prediction (AMVP). For a current inter coded block that is coded with AMVP, its number of reference pictures, reference picture indices, and associated motion vectors are explicitly signaled and encoded into the bitstream.

In general, the block merge method is a cheaper alternative compared to the explicit motion information signalling method in terms of number of bits spent on signalling of motion information since only one index value (i.e., merge_idx) needs to be signaled. When encoding an inter block, an encoder may choose to encode a block in the merge mode since the merge method gives the smaller RD cost than the explicit motion information signalling method, even though the derived (i.e., inherited) motion information from neighboring inter blocks does not suit well for the current block. Despite the downside of providing relatively poor fit, the benefit of substantial cheaper signalling cost may outweigh the downside. But it would be still good to improve fit without spending more bits.

Decoder Side Motion Vector Refinement (DMVR)

VVC includes a tool called DMVR to further refine MVs for blocks coded in the merge mode with bi-predictive MVs. DMVR may improve the fit without spending more bits.

Figure 5:
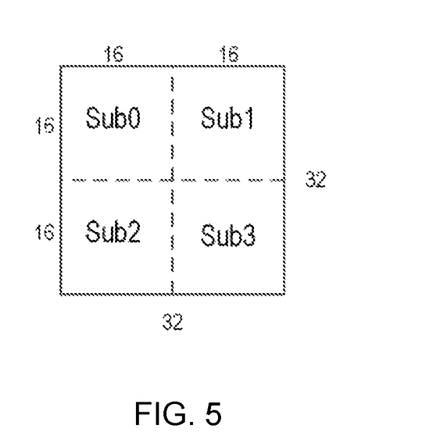
FIG. 5 shows an example of a block and subblocks.

The DMVR refines the MVs on a subblock basis. A first step of the DMVR is to split a current block into a group of subblocks. For example, if a current inter block has width=W and height=H, the width sbW of each sub-block may be min (W, 16). Similarly, the height sbH of each subblock may be min (H, 16). The min (,) function here takes the minimum of the two input values of the function. The DMVR then carries out MV refinement for each sub-block having the size of sbW×sbH. FIG. 5 shows a 32×32 block and four 16×16 subblocks corresponding to the 32×32 block.

Figure 6:
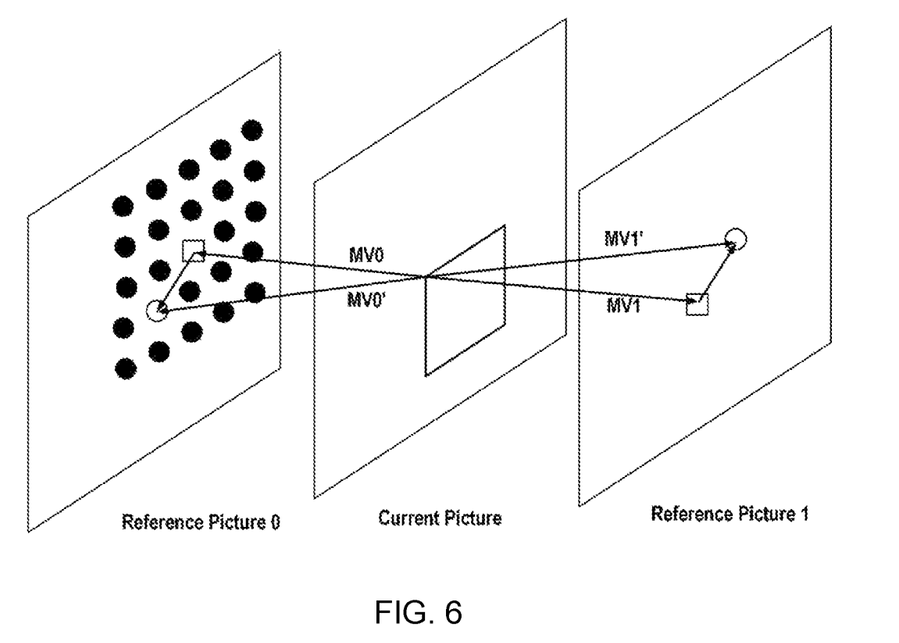
FIG. 6 shows an example of initial MVs and a search window.
Figure 7:
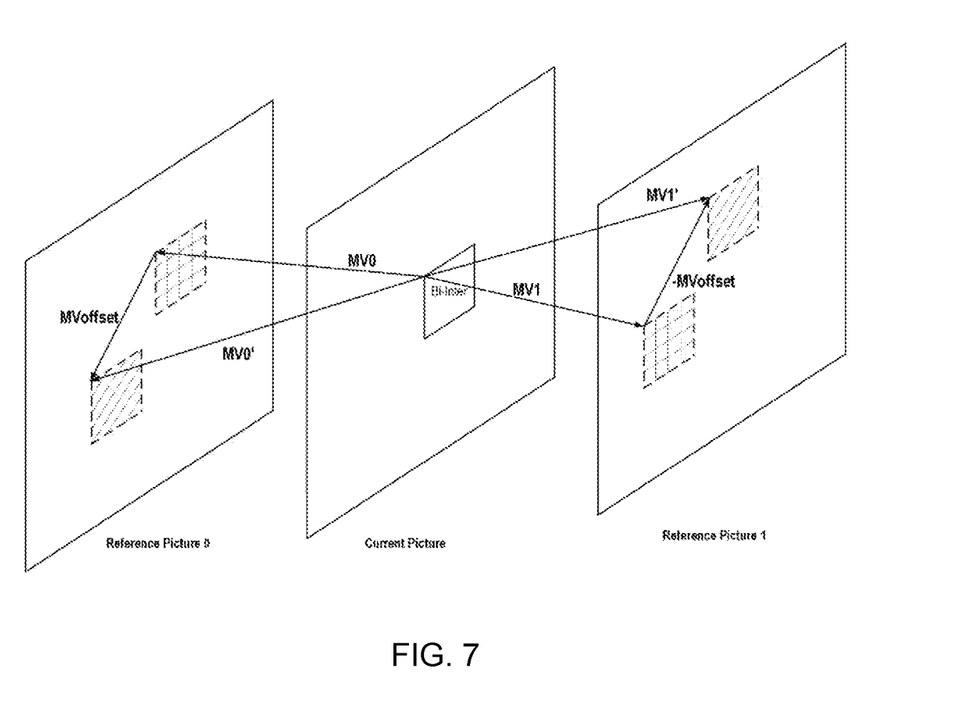
FIG. 7 shows an example of initial MVs, MVoffsets, and refined MVs.

The initial MVs (i.e., the MVs to be refined) are derived using the merge method. As shown in FIG. 6, the initial MVs for the current block are assumed to be MV0 and MV1. In FIG. 6, the positions associated with the initial MVs are marked as squares in the reference pictures 0 and 1, and positions associated with a search window are marked as circles.

Each circle may represent an offset MVoffset with respect to the initial MV position. For example, the hollow circle corresponds to an MVoffset=(−1, 1) with respect to the initial position of MV0 (the square in the reference picture 0). This hollow circle corresponds to a new motion vector MV0' which may be equal to MV0+MVoffset. A mirroring rule is followed for deriving the new motion vector MV1' which may be equal to MV1−Mvoffset.

In other words, any points inside the search window may result in a new MV pair (MV0', MV1'):

$$MV0' = MV0 + MVoffset$$
$$MV1' = MV1 - MVoffset,$$

where MVoffset represents the offset between the initial MV and the refined MV in one of the reference pictures. In VVC, the maximum x or y component for MVoffset is set to be 2 integer samples.

DMVR searches all MVoffsets within the search window and finds the MVoffset that gives the smallest difference between the L0 reference block and the L1 reference block. The difference is calculated as the sum of absolute difference (SAD) between a sample value within the L0 reference block and a sample value within the L1 reference block, i.e. SAD=$\Sigma_{x,y}$|P0 (x,y)−P1 (x,y)|, where P0 and P1 are the sample values within the L0 and L1 reference blocks.

Then, the refined MVs (derived from the best MVoffset) may be used to generate prediction samples for the current block.

In VVC, there is no block level flag explicitly signalled for turning on/off DMVR. In other words, when the initial MVs are bi-predictive and some other conditions are met, the DMVR is applied even without explicit signalling. A list of conditions for determining whether DMVR is applicable for a current block is found in B. Bross, J. Chen, S. Liu, Y.-K. Wang "Versatile Video Coding (Draft 10)," Document number JVET-S2001-vH. Teleconference, July 2020 (which is incorporated by reference). Some of the conditions are as follows:

The block is in the merge mode and the block's MVs are bi-predictive MVs.
The block has more than 64 samples.
The height of the block and the width of the block are larger than or equal to 8 samples.
The bi-predictive MVs point to one reference picture before the current picture in display order and another reference picture after the current picture in the display order.
The distances from the two reference pictures to the current picture are the same.
Both reference pictures are short-term reference pictures.
Bi-prediction with CU-level weights (BCW) weight index uses equal weights.
Weighted prediction is not enabled for the block.
Combined intra-inter prediction mode is not enabled for the block.

SUMMARY

Certain challenges presently exist. For example, the existing DMVR scheme refines MV(s) for each subblock independently. This may introduce inconsistencies to the refined MVs among the subblocks. Here, the inconsistencies mean large differences or variations between the MVs. As an example, in case refined MVs for two adjacent subblocks have a difference of 4 integer samples in x or y component, such difference is very likely to result in noticeable subblock boundaries in the reconstructed pictures, thereby resulting in worse subjective quality.

Figure 8:
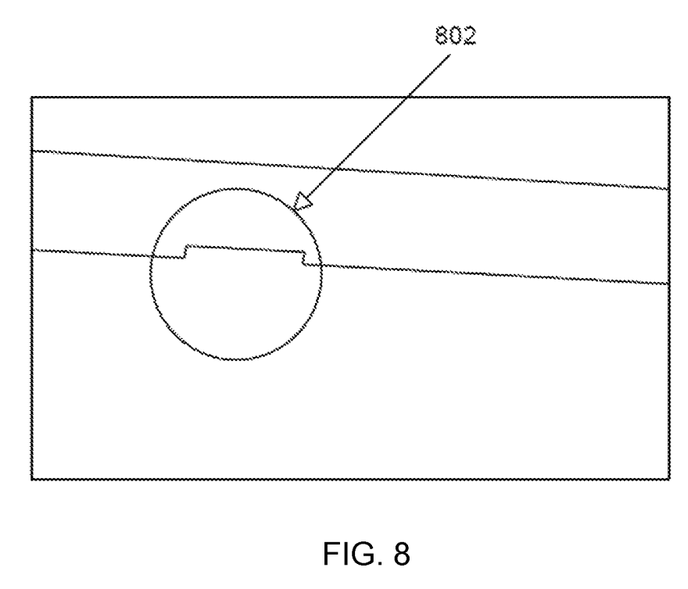
FIG. 8 shows an example of a problematic area in a reconstructed picture.

FIG. 8 shows an example of a problematic area 802 from a reconstructed picture coded with VTM-11 (the VVC reference software) encoder. The area 802 corresponds to a block with DMVR applied. In the block shown in FIG. 8, the subblock boundaries can be clearly seen.

Therefore, in some embodiments of this disclosure, a method of selectively triggering DMVR for encoding a current block is provided. The method may determine whether a current block is likely to suffer from the DMVR subjective problem. If so, the method may choose another pair of MVs or other modes to avoid applying DMVR to the current block. The method may be performed by one or more entities at an encoder side.

Accordingly, in one aspect, there is provided a method of encoding a picture. The method may comprise selecting a motion vector, MV, for a current block within the picture. The method may further comprise determining whether a condition is satisfied, wherein determining whether the condition is satisfied comprises: (i) determining if a subblock-based motion refinement is applicable for the current block and (ii) determining if a first subblock within the current block satisfies a criteria. The method may further comprise, as a result of determining that the condition is satisfied, not using the selected MV for encoding the current block.

In another aspect, there is provided a computer program comprising instructions which when executed by processing circuitry cause the processing circuitry to perform the method described above.

In another aspect, there is provided an apparatus for encoding a picture. The apparatus may be configured to select a motion vector, MV, for a current block within the picture. The apparatus may further be configured to determine whether a condition is satisfied, wherein determining whether the condition is satisfied comprises: (i) determining if a subblock-based motion refinement is applicable for the current block and (ii) determining if a first subblock within the current block satisfies a criteria. The apparatus may further be configured to, as a result of determining that the condition is satisfied, not use the selected MV for encoding the current block.

In another aspect, there is provided an apparatus a memory and processing circuitry coupled to the memory. The apparatus may be configured to perform the method described above.

Advantages

By avoiding the application of DMVR in cases where a current block is likely to suffer from the DMVR subjective problem (e.g., the problem that subblock boundaries can be clearly seen), the quality of encoded picture/video can be improved.

BRIEF DESCRIPTION OF THE DRAWINGS

The accompanying drawings, which are incorporated herein and form part of the specification, illustrate various embodiments.

DETAILED DESCRIPTION

As discussed above, embodiments of this disclosure avoid applying DMVR for blocks that are prone to DMVR subjective problems, thereby improving subjective quality.

Figure 9:
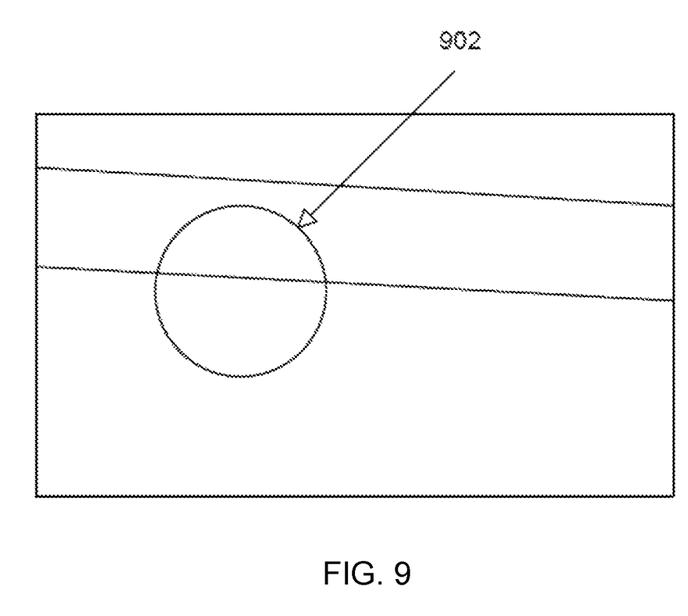
FIG. 9 shows an example of an improved area in a reconstructed picture.

FIG. 9 shows area 902 corresponding to area 802. The area 902 is encoded using the method according to the embodiments of this disclosure. Thus, in FIG. 9, the subblock boundaries shown in the area 802 are removed.

Instead of selectively applying DMVR, DMVR may be turned off completely for the entire video sequence. But turning off DMVR completely may result in a significant reduction in compression gain (i.e., compression performance).

The following tables show the objective performance of the encoding method according to the embodiments of this disclosure as compared to VTM-11 (the VVC reference software) and VTM-11 with DMVR-off. The numbers in the tables show the relative bit-cost for the method to achieve equivalent objective video quality (measured in PSNR) as VTM-11 and VTM-11 with DMVR-off. The BD-rate number-0.67% means that the method requires 0.67% less bits than VTM-11 with DMVR-off to achieve the same objective video quality. As illustrated in the table, most of the compression gain from DMVR is preserved in the method according to the embodiments of this disclosure.

TABLE 1

The performance of the method according to the embodiments of this disclosure compared to VTM-11 with DMVR-off.

| | Random access Main10 Proposed solution Over DMVR off | | |
| --- | --- | --- | --- |
| | Y | U | V |
| Class A1 | −0.14% | −0.34% | −0.44% |
| Class A2 | −1.31% | −1.55% | −1.58% |
| Class B | −0.62% | −0.86% | −0.79% |
| Class C | −0.66% | −0.91% | −0.92% |
| Class E | | | |
| Overall | −0.67% | −0.91% | −0.91% |
| Class D | −0.76% | −1.02% | −1.26% |

TABLE 1-continued

The performance of the method according to the embodiments of this disclosure compared to VTM-11 with DMVR-off.

| | Random access Main10 Proposed solution Over DMVR off | | |
| --- | --- | --- | --- |
| | Y | U | V |
| Class F | −0.28% | −0.37% | −0.32% |

TABLE 2

The performance of the method according to embodiments of this disclosure compared to VTM-11.0 (which has DMVR turned on).

| | Random access Main10 Proposed solution Over VTM-11.0 | | |
| --- | --- | --- | --- |
| | Y | U | V |
| Class A1 | 0.70% | 0.69% | 0.70% |
| Class A2 | 0.24% | 0.26% | 0.21% |
| Class B | 0.14% | 0.15% | 0.23% |
| Class C | 0.01% | 0.00% | 0.07% |
| Class E | | | |
| Overall | 0.24% | 0.24% | 0.28% |
| Class D | 0.00% | 0.00% | 0.00% |
| Class F | 0.05% | 0.07% | 0.07% |

Embodiments of this disclosure provide a method for selectively applying a subblock-based motion refinement (e.g., DMVR in VVC). The term "subblock-based" means that the motion refinement is carried out on a subblock basis (i.e., a grid of samples having a size that is smaller than the size of a block). The method may be performed by an encoder. Even though DMVR is one type of subblock-based motion refinements, for simple explanation, DMVR and subblock-based motion refinement are used in this disclosure interchangeably.

When evaluating whether to encode a current block with a pair of initial MVs (thereby determining whether to trigger or not trigger DMVR), the method according to some embodiments may determine whether all of a current subblock and neighboring subblocks (e.g., the subblock that is located right above the current subblock and the subblock that is located on the left side of the current subblock) have low spatial activity. If so, the refined MVs obtained from DMVR for the current subblock and the neighboring subblocks are compared to each other. When the difference between the refined MVs for current subblocks and the neighboring subblocks exceeds a threshold, the method may restrict the encoder not to encode the current block with the initial MVs to prevent triggering DMVR. For low spatial activity subblocks (usually corresponding to smooth areas), inconsistent MVs among subblocks may lead to visible subblock boundaries. The method according to embodiments of this disclosure may prevent making such subblock boundaries visible.

1. Method for Selectively Triggering DMVR

For encoding a current block within a current picture inside a video sequence, an encoder may implement a method of selectively triggering DMVR for the current block. To determine whether to trigger DMVR, the method may evaluate whether to encode the current block with a first MV candidate (e.g., MV0). As discussed above, the first MV candidate may be obtained using the merge method.

If the encoder decides not to encode the current block with the first MV candidate, DMVR is not triggered. On the other hand, if the encoder decides to encode the current block with the first MV candidate, DMVR may be triggered. The method may comprise the following steps:

Step 1) The encoder may determine if DMVR is applicable for the current block with the first MV candidate.

Step 2) In response to determining that DMVR is applicable for the current block with the first MV candidate:

Step 2-1) The encoder may determine to evaluate a subblock within the current block and (optionally) derive a refined MV for the subblock using DMVR.

Step 2-2) The encoder may determine if the subblock satisfies a first criterion A.

Step 3) In response to determining that the first criterion A is satisfied, the encoder may determine not to encode the current block with the first MV candidate.

By deciding not to encode the current block with the first MV candidate, DMVR is not triggered.

One way of not letting the encoder to encode the current block with the first MV candidate is to set the associated RD cost of the first MV candidate to be the maximum allowed value. For example, if the RD cost in the encoder is stored in a 16-bit unsigned variable, the associated RD cost may be set to (2^16−1).

In the above embodiments, the step 3 is performed if there is any subblock within the current block that satisfies the first criterion A. However, in other embodiments, the step 3 is performed only if there is at least a particular number of subblocks within the current block that satisfy the first criterion A. In further embodiments, the step 3 is performed only if all subblocks within the current block satisfy the first criterion A.

2. Evaluating Whether the First Criterion a is Satisfied

In some embodiments, the satisfaction of the first criterion A may be determined based on the spatial activity value (Sa) of the subblock that is subject to the step 2-1 and the step 2-2 (herein after "current subblock"). The first criterion A may be determined to be satisfied when the spatial activity value (Sa) is not greater than (or equal to) a spatial activity threshold Th1. In other words, the first criterion A is determined to be satisfied if the current subblock is a low spatial activity subblock.

The spatial activity value of the current subblock may be calculated based on the values of source samples inside the current subblock. For example, in one embodiment, the spatial activity value of the current subblock may be calculated as an average of the spatial activity values of a plurality of samples (e.g., all samples) inside the subblock.

There are different ways of calculating the spatial activity value of a sample inside the current subblock. For example, in case $P_{i,j}$ denotes the value of a current sample of the original (i.e., uncompressed) picture at position (i, j) inside the current subblock, the spatial activity value $Act_{i,j}$ of the current sample may be calculated as an averaged absolute sample value difference between the current sample and its one or more neighboring samples (e.g., the neighboring sample(s) located above or at the left side of the current sample).

More specifically, in one example, the spatial activity value of the current sample may be calculated as $Act_{i,j}=(|P_{i,j}-P_{i-1,j}|+|P_{i,j}-P_{i,j-1}|)/2$, where $P_{i-1,j}$ denotes the value of the neighboring sample at the left side of the current sample and $P_{i,j-1}$ denotes the value of the neighboring sample above the current sample.

Then if the current subblock has the size of M×N (where M is the number of samples in a column of the subblock and N is the number of samples in a row of the subblock), the spatial activity value of the current subblock may be calculated as $Sa=(\Sigma_{i\in M, j\in N} Act_{i,j})/(M\times N)$.

In other embodiments, instead of calculating the spatial activity value of the current subblock as an average of the spatial activity values of all samples inside the current subblock, the spatial activity values of the first row and first column of samples in the current subblock may be excluded when calculating the spatial activity value of the current subblock. That is because the samples in the first row and/or the samples in the first column do not have any neighboring samples (from the same subblock) that are above or at the left side of the samples. In such embodiments, the spatial activity value of the current subblock may be calculated as $Sa=(\Sigma_{i\in M-1, j\in N-1} Act_{i,j})/((M-1)\times(N-1))$.

In other embodiments, the spatial activity value of the current subblock may be measured as the variance of the sample values inside the current subblock.

In other embodiments, instead of using the values of the original (i.e., uncompressed) samples, the values of predicted samples may be used to calculate the spatial activity value of a sample inside the current subblock.

In such embodiments, the spatial activity value $Act_{i,j}$ of a current sample at position (i, j) that is within the picture and inside the current subblock may be calculated as $Act_{i,j}=(|R_{i,j}-R_{i-1,j}|+|R_{i,j}-R_{i,j-1}|)/2$, where $R_{i,j}$ is the value of the current sample (located at (i, j) within the picture) of the current subblock that is obtained using a refined motion vector $rMV_{curr}$ for the current subblock, and the refined motion vector $rMV_{curr}$ is obtained using DMVR.

Similarly, the spatial activity values of samples inside subblocks neighboring the current subblock (e.g., the neighboring subblock that is disposed above the current subblock and the neighboring subblock that is disposed at the left side of the subblock) may be calculated from the predicted samples obtained by using the refined motion vectors $rMV_{above}$ and $rMV_{left}$.

In other embodiments, instead of using predicted samples obtained from the refined motion vectors to calculate the spatial activity values of the samples, predicted samples obtained from non-refined motion vectors may be used to calculate the spatial activity values. Before the refinement, all subblocks within the current block have the same motion vector (MV) as the current block.

In such embodiments, the spatial activity value $Act_{i,j}$ of a current sample at position (i, j) that is within the picture and inside the current subblock may be calculated as $Act_{i,j}=(|R_{i,j}-R_{i-1,j}|+|R_{i,j}-R_{i,j-1}|)/2$, wherein $R_{i,j}$ is the value of the current sample (located at (i, j) within the picture) of the current subblock that is obtained using the unrefined motion vector MV, i.e., the motion vector of the current block.

Similarly, the spatial activity values of samples inside subblocks neighboring the current subblock (e.g., the neighboring subblock that is disposed above the current subblock and the neighboring subblock that is disposed at the left side of the subblock) may be calculated from the predicted samples obtained by using the unrefined motion vector MV.

3. Setting the Spatial Activity Threshold Th1

In one embodiment, the spatial activity threshold Th1 may depend on the quantization parameter (QP) of the current block. In other words, Th1 may be a function of QP. As QP increases, Th1 may also increase. The function used to derive Th1 may be a polynomial function of QP. For example, the function may be $Th1=f(QP)=a+b*QP+c*QP^2$, where a=0, b=0.0667, and c=0.0109.

In other embodiment, the function used to derive Th1 from QP may be implemented as a look-up table. Here QP is the input entry to the look-up table and Th1 is the stored look-up value in the look-up table. The table below is an example of the look-up table.

| QP  | 0  | 1  | 2  | 3  | 4  | 5  | 6  | 7  | 8  | 9  | 10 | 11 | 12 | 13 | 14 | 15 | 16 | 17 | 18 |
|-----|----|----|----|----|----|----|----|----|----|----|----|----|----|----|----|----|----|----|----|
| Th1 | 0  | 0  | 0  | 0  | 0  | 1  | 1  | 1  | 1  | 1  | 2  | 2  | 2  | 3  | 3  | 3  | 4  | 4  | 5  |
| QP  | 19 | 20 | 21 | 22 | 23 | 24 | 25 | 26 | 27 | 28 | 29 | 30 | 31 | 32 | 33 | 34 | 35 | 36 | 37 |
| Th1 | 5  | 6  | 6  | 7  | 7  | 8  | 9  | 9  | 10 | 10 | 11 | 12 | 13 | 13 | 14 | 15 | 16 | 17 | 18 |
| QP  | 38 | 39 | 40 | 41 | 42 | 43 | 44 | 45 | 46 | 47 | 48 | 49 | 50 | 51 | 52 | 53 | 54 | 55 | 56 |
| Th1 | 18 | 19 | 20 | 21 | 22 | 23 | 24 | 25 | 26 | 27 | 29 | 30 | 31 | 32 | 33 | 34 | 36 | 36 | 36 |
| QP  | 57 | 58 | 59 | 60 | 61 | 62 | 63 |    |    |    |    |    |    |    |    |    |    |    |    |
| Th1 | 36 | 37 | 37 | 37 | 37 | 37 | 37 |    |    |    |    |    |    |    |    |    |    |    |    |

In other embodiment, the spatial activity threshold Th1 may depend on QP of the current slice instead of QP of the current block.

In other embodiment, Th1 may depend on the hierarchy level of the current picture. In such embodiment, pictures with higher hierarchy levels may result in higher Th1.

4. First Additional Condition for not Triggering DMVR

As discussed above, if (1) DMVR is applicable for the current block with the first MV candidate and (2) if there is any subblock that satisfies the first criterion A, the encoder may determine not to encode the current block with the first MV candidate, thereby not triggering DMVR.

In some embodiments, there may be additional conditions for determining whether to encode the current block with the first MV candidate. The additional conditions include that one or more subblocks neighboring the current subblock (e.g., the neighboring subblocks disposed above or at the left side of the current subblock) satisfies the first criterion A. Thus, the method of selectively triggering DMVR may further comprise determining whether one or more subblocks neighboring the current subblock (e.g., the neighboring subblocks disposed above or at the left side of the current subblock) satisfies the first criterion A. If all of the current subblock and the neighboring subblock(s) are low-spatial activity subblocks (i.e., if all of the current subblock and the neighboring subblock(s) satisfy the first criterion A), the encoder may determine not to encode the current block with the first MV candidate.

5. Second Additional Condition for not Triggering DMVR

In some embodiments, determining whether to encode the current block with the first MV candidate may further depend on satisfying an additional restriction criterion ("second criterion B") that is related to refined MV(s) of subblock(s) included in the current block.

In such embodiments, the encoder may perform the following steps for encoding a current block within a current picture inside a video sequence:

Step 1) The encoder may determine if DMVR is applicable for the current block with the first MV candidate. As discussed above, the first MV candidate may be obtained using the merge method.

Step 2) In response to determining that DMVR is applicable for the current block with the first MV candidate:

Step 2-1) The encoder may determine to evaluate a subblock within the current block.

Step 2-2) The encoder may determine if the subblock satisfies the first criterion A.

Step 3) After determining that the subblock satisfies the first criterion A:

Step 3-1) The encoder may derive for the subblock a refined MV using DMVR.

Step 3-2) The encoder may determine if the subblock satisfies the second criterion B.

Step 4) In response to determining that the subblock satisfies the first criterion A and the second criterion B, the encoder may determine not to encode the current block with the first MV candidate, thereby preventing the triggering of DMVR.

In the above embodiments, the step 4 is performed if there is any subblock within the current block that satisfies the first criterion A and the second criterion B. However, in other embodiments, the step 4 may be performed if there is at least a particular number of subblocks within the current block that satisfy the first criterion A and the second criterion B. In further embodiments, the step 4 may be performed only if all subblocks within the current block satisfy the first criterion A and the second criterion B.

Also, in other embodiments, the steps 3 through 3-2 may be performed prior to the steps 2 through 2-2. In such embodiment, the encoder may perform the steps 3-1 and 3-2 in response to determining that DMVR is applicable to the current block with the first MV candidate, and after determining that the subblock satisfies the second criterion B, the encoder may perform the steps 2-1 and 2-2.

The second criterion B may be determined to be satisfied if the absolute difference between the current subblock's refined MV (mvC) and the neighboring subblock's refined MV is not smaller than a threshold Th2.

For example, if mvA is the refined MV from the above neighboring subblock and mvL is the refined MV from the left neighboring subblock, then, when one of the following conditions is satisfied, the second criterion B may be determined to be satisfied.

$$|mvC \cdot x - mvA \cdot x| \geq Th2$$

$$|mvC \cdot y - mvA \cdot y| \geq Th2$$

$$|mvC \cdot x - mvL \cdot x| \geq Th2$$

$$|mvC \cdot x - mvL \cdot y| \geq Th2$$

In some embodiments, Th2 may have a precision of one sample (e.g., Th2=1 sample, 2 samples, . . . ). In other embodiments, however, Th2 may have a precision of a fraction of one sample. For example, Th2 may have a precision of 1/16 sample and have a value of 24 (i.e., Th2=24/16 samples).

6. Block Size Threshold

In some embodiments, the method of selectively triggering DMVR may be enabled only for blocks having a certain size. For example, the method may be enabled only for blocks having the size that is not smaller than 64×64.

7. QP Threshold

In some embodiments, the method for selectively triggering DMVR may be enabled only for blocks with QPs that are above (or equal to) a certain QP threshold (e.g., 41). In other words, the method may be inactivated when a block has a QP that is lower than the QP threshold. Alternatively, the method may be enabled for blocks that are within a slice having a QP above a certain QP threshold or within a picture having a QP above a certain QP threshold.

Figure 10:
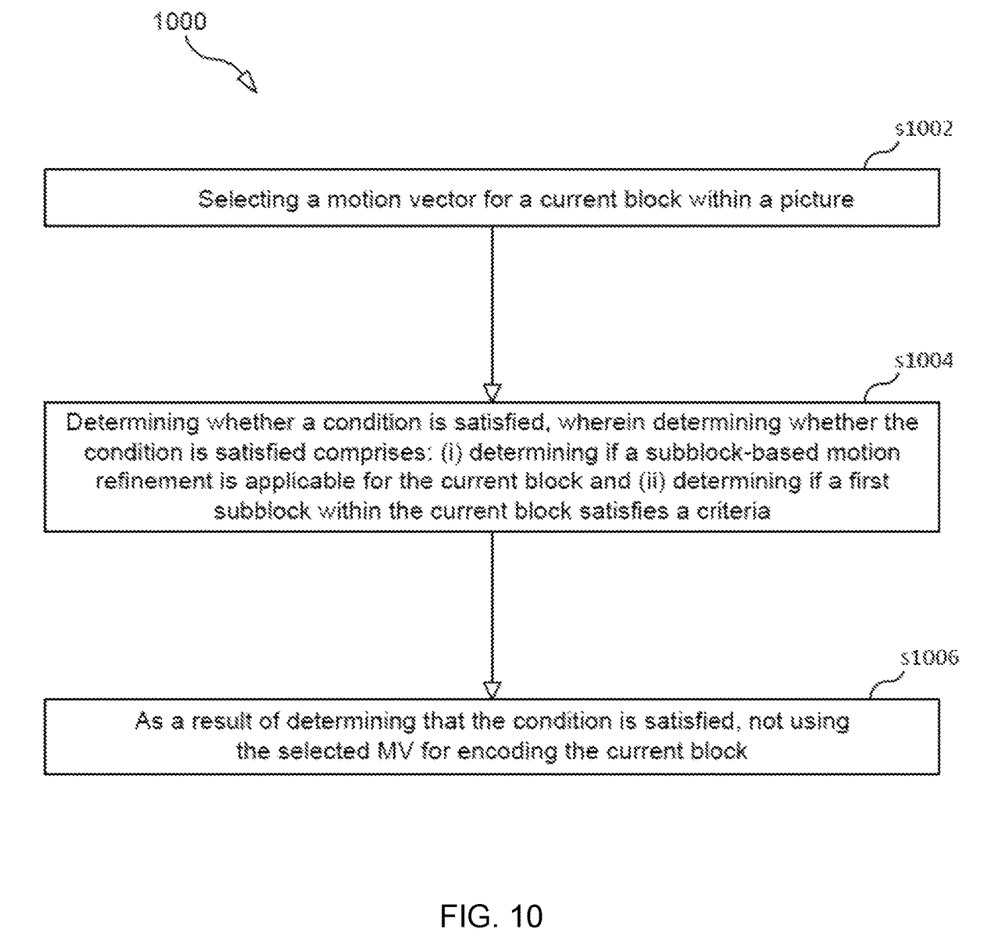
FIG. 10 shows a process according to embodiments.

FIG. 10 shows a process 1000 according to some embodiments. The process 1000 may begin with step s1002. Step s1002 comprises selecting a motion vector (MV) for a current block within the picture. Step s1004 comprises determining whether a condition is satisfied. Determining whether the condition is satisfied may comprise: (i) determining if a subblock-based motion refinement is applicable for the current block and (ii) determining if a first subblock within the current block satisfies a criteria. Step s1006 comprises as a result of determining that the condition is satisfied, not using the selected MV for encoding the current block.

In some embodiments, determining if the first subblock within the current block satisfies the criteria is performed as a result of determining that the subblock-based motion refinement is applicable for the current block.

In some embodiments, the subblock-based motion refinement is decoder side motion refinement (DMVR).

In some embodiments, determining if the first subblock within the current block satisfies the criteria comprises: calculating a spatial activity value of the first subblock, comparing the calculated spatial activity value to a spatial activity threshold, and based on the comparison, determining whether the first subblock satisfies the criteria.

In some embodiments, the spatial activity value of the first subblock is calculated based on a spatial activity value of at least one picture sample associated with the first subblock.

In some embodiments, the spatial activity value of said at least one picture sample is determined based on sample values of two or more picture samples associated with the first subblock.

In some embodiments, said at least one picture sample is a first picture sample having a first sample value, said two or more picture samples include i) the first picture sample, ii) a second picture sample neighboring the first picture sample and having a second sample value, and iii) a third picture sample neighboring the first picture sample and having a third sample value, and the spatial activity value of said at least one picture sample is determined based on an average of a first absolute sample value difference between the first sample value and the second sample value and a second absolute sample value difference between the first sample value and the third sample value.

In some embodiments, said two or more picture samples are uncompressed picture samples.

In some embodiments, said two or more picture samples are prediction samples generated using the selected MV or a refined MV obtained using the subblock-based motion refinement.

In some embodiments, the spatial activity threshold is determined based on one or a combination of the followings: a quantization parameter (QP) associated with the current block, a QP associated with a current slice, or a hierarchy level of the picture, and the spatial activity threshold increases as one or a combination of the QP associated with the current block, the QP associated with the current slice, or the hierarchy level of the picture increases.

In some embodiments, when i) a subblock-based motion refinement is applicable for the current block and ii) the first subblock satisfies the criteria, then the condition is satisfied.

In some embodiments, it is determined that the first subblock satisfies the criteria, and determining whether the condition is satisfied further comprises determining whether one or more subblocks neighboring the first subblock satisfy the criteria.

In some embodiments, when i) a subblock-based motion refinement is applicable for the current block, ii) the first subblock satisfies the criteria, and iii) each of said one or more subblocks neighboring the first subblock satisfies the criteria, then the condition is satisfied.

In some embodiments, determining whether the condition is satisfied further comprises obtaining a first refined MV for the first subblock, wherein the first refined MV is obtained using the subblock-based motion refinement, obtaining a second refined MV for a subblock neighboring the first subblock, wherein the second refined MV is obtained using the subblock-based motion refinement, comparing a difference value between the first refined MV and the second refined MV to a threshold value, and determining whether the condition is satisfied based at least on the result of the comparison.

In some embodiments, the method is enabled only if: (i) the size of the current block is greater than or equal to a block size threshold, (ii) a QP associated with the current block is greater than or equal to a QP threshold, or (iii) a QP associated with a picture or a slice including the current block is greater than or equal to a QP threshold.

Figure 11:
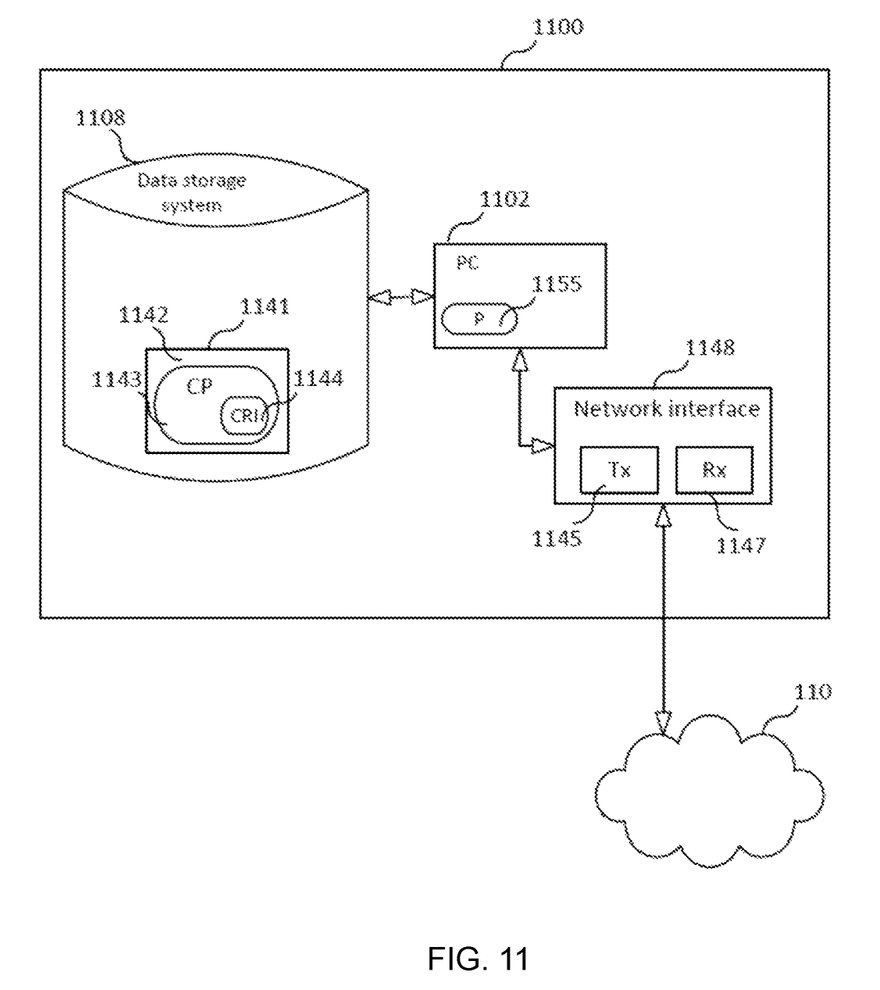
FIG. 11 shows an apparatus according to embodiments.

FIG. 11 is a block diagram of an apparatus 1100 for implementing the encoder discussed above, according to some embodiments. As shown in FIG. 11, apparatus 1100 may comprise: processing circuitry (PC) 1102, which may include one or more processors (P) 1155 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1100 may be a distributed computing apparatus); at least one network interface 1148 comprising a transmitter (Tx) 1145 and a receiver (Rx) 1147 for enabling apparatus 1100 to transmit data to and receive data from other nodes connected to a network 110 (e.g., an Internet Protocol (IP) network) to which network interface 1148 is connected (directly or indirectly) (e.g., network interface 1148 may be wirelessly connected to the network 110, in which case network interface 1148 is connected to an antenna arrangement); and a storage unit (a.k.a., "data storage system") 1108, which may include one or more non-volatile storage devices and/or one or more volatile storage devices. In embodiments where PC 1102 includes a programmable processor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, magnetic media (e.g., a hard disk), optical media, memory devices (e.g., random access memory, flash memory), and the like. In some embodiments, the CRI 1144 of computer program 1143 is configured such that when executed by PC 1102, the CRI causes apparatus 1100 to perform steps described herein (e.g., steps described herein with reference to the flow charts). In other embodiments, apparatus 1100 may be configured to perform steps described herein without the need for code. That is, for example, PC 1102 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method of encoding a picture, the method comprising:
   selecting a motion vector, MV, for a current block within the picture;
   determining whether a condition is satisfied, wherein determining whether the condition is satisfied comprises: (i) determining if a subblock-based motion refinement is applicable for the current block and (ii) determining if a first subblock within the current block satisfies a criteria; and
   as a result of determining that the condition is satisfied, not using the selected MV for encoding the current block,
   wherein determining if the first subblock within the current block satisfies the criteria is performed as a result of determining that the subblock-based motion refinement is applicable for the current block and wherein determining if the first subblock within the current block satisfies the criteria comprises:
   calculating a spatial activity value of the first subblock,
   comparing the calculated spatial activity value to a spatial activity threshold, and
   based on the comparison, determining whether the first subblock satisfies the criteria.

2. The method of claim 1, wherein the spatial activity value of the first subblock is calculated based on a spatial activity value of at least one picture sample associated with the first subblock.

3. The method of claim 2, wherein the spatial activity value of said at least one picture sample is determined based on sample values of two or more picture samples associated with the first subblock.

4. The method of claim 3, wherein
   said at least one picture sample is a first picture sample having a first sample value,
   said two or more picture samples include i) the first picture sample, ii) a second picture sample neighboring the first picture sample and having a second sample value, and iii) a third picture sample neighboring the first picture sample and having a third sample value, and
   the spatial activity value of said at least one picture sample is determined based on an average of a first absolute sample value difference between the first sample value and the second sample value and a second absolute sample value difference between the first sample value and the third sample value.

5. The method of claim 3, wherein said two or more picture samples are uncompressed picture samples.

6. The method of claim 3, wherein said two or more picture samples are prediction samples generated using the selected MV or a refined MV obtained using the subblock-based motion refinement.

7. The method of claim 1, wherein
   the spatial activity threshold is determined based on one or a combination of the followings: a quantization parameter, QP, associated with the current block, a QP associated with a current slice, or a hierarchy level of the picture, and
   the spatial activity threshold increases as one or a combination of the QP associated with the current block, the QP associated with the current slice, or the hierarchy level of the picture increases.

8. The method of claim 1, wherein when i) the subblock-based motion refinement is applicable for the current block and ii) the first subblock satisfies the criteria, then the condition is satisfied.

9. The method of claim 1, wherein
   it is determined that the first subblock satisfies the criteria, and
   determining whether the condition is satisfied further comprises determining whether one or more subblocks neighboring the first subblock satisfy the criteria.

10. The method of claim 9, wherein when i) the subblock-based motion refinement is applicable for the current block, ii) the first subblock satisfies the criteria, and iii) each of said one or more subblocks neighboring the first subblock satisfies the criteria, then the condition is satisfied.

11. The method of claim 1, wherein
    determining whether the condition is satisfied further comprises:
    obtaining a first refined MV for the first subblock, wherein the first refined MV is obtained using the subblock-based motion refinement,
    obtaining a second refined MV for a subblock neighboring the first subblock, wherein the second refined MV is obtained using the subblock-based motion refinement,
    comparing a difference value between the first refined MV and the second refined MV to a threshold value, and
    determining whether the condition is satisfied based at least on the result of the comparison.

12. The method of claim 1, wherein the method is enabled only if:
    (i) the size of the current block is greater than or equal to a block size threshold,
    (ii) a QP associated with the current block is greater than or equal to a QP threshold, or
    (iii) a QP associated with a picture or a slice including the current block is greater than or equal to a QP threshold.

13. The method of claim 1, wherein the subblock-based motion refinement is decoder side motion refinement, DMVR.

14. An apparatus for encoding a picture, the apparatus comprising processing circuitry, the processing circuitry being configured to cause the apparatus to:
    select a motion vector, MV, for a current block within the picture;
    determine whether a condition is satisfied, wherein determining whether the condition is satisfied comprises: (i) determining if a subblock-based motion refinement is applicable for the current block and (ii) determining if a first subblock within the current block satisfies a criteria; and as a result of determining that the condition is satisfied, not use the selected MV for encoding the current block, wherein determining if the first subblock within the current block satisfies the criteria is performed as a result of determining that the subblock-based motion refinement is applicable for the current block and wherein determining if the first subblock within the current block satisfies the criteria comprises:

calculating a spatial activity value of the first subblock, comparing the calculated spatial activity value to a spatial activity threshold, and based on the comparison, determining whether the first subblock satisfies the criteria.

15. The apparatus of claim 14, wherein the spatial activity value of the first subblock is calculated based on a spatial activity value of at least one picture sample associated with the first subblock.

16. The apparatus of claim 15, wherein the spatial activity value of said at least one picture sample is determined based on sample values of two or more picture samples associated with the first subblock.

17. The apparatus of claim 16, wherein said at least one picture sample is a first picture sample having a first sample value, said two or more picture samples include i) the first picture sample, ii) a second picture sample neighboring the first picture sample and having a second sample value, and iii) a third picture sample neighboring the first picture sample and having a third sample value, and the spatial activity value of said at least one picture sample is determined based on an average of a first absolute sample value difference between the first sample value and the second sample value and a second absolute sample value difference between the first sample value and the third sample value.

18. The apparatus of claim 14, wherein the spatial activity threshold is determined based on one or a combination of the followings: a quantization parameter, QP, associated with the current block, a QP associated with a current slice, or a hierarchy level of the picture, and the spatial activity threshold increases as one or a combination of the QP associated with the current block, the QP associated with the current slice, or the hierarchy level of the picture increases.

19. The apparatus of claim 14, wherein determining whether the condition is satisfied further comprises:

obtaining a first refined MV for the first subblock, wherein the first refined MV is obtained using the subblock-based motion refinement, obtaining a second refined MV for a subblock neighboring the first subblock, wherein the second refined MV is obtained using the subblock-based motion refinement, comparing a difference value between the first refined MV and the second refined MV to a threshold value, and determining whether the condition is satisfied based at least on the result of the comparison.

20. A non-transitory computer readable storage medium storing a computer program for encoding a picture, the computer program comprising computer code which, when run on processing circuitry of an apparatus, causes the apparatus to:

select a motion vector, MV, for a current block within the picture;

determine whether a condition is satisfied, wherein determining whether the condition is satisfied comprises: (i) determining if a subblock-based motion refinement is applicable for the current block and (ii) determining if a first subblock within the current block satisfies a criteria; and as a result of determining that the condition is satisfied, not use the selected MV for encoding the current block, wherein determining if the first subblock within the current block satisfies the criteria is performed as a result of determining that the subblock-based motion refinement is applicable for the current block and wherein determining if the first subblock within the current block satisfies the criteria comprises:

calculating a spatial activity value of the first subblock, comparing the calculated spatial activity value to a spatial activity threshold, and based on the comparison, determining whether the first subblock satisfies the criteria.

* * * * *